(12) United States Patent
Maehata

(10) Patent No.: US 10,177,830 B2
(45) Date of Patent: Jan. 8, 2019

(54) ARRAY ANTENNA SYSTEM

(71) Applicant: SUMITOMO ELECTRIC INDUSTRIES, LTD., Osaka-shi, Osaka (JP)

(72) Inventor: Takashi Maehata, Osaka (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 0 days.

(21) Appl. No.: 15/564,439

(22) PCT Filed: Apr. 18, 2016

(86) PCT No.: PCT/JP2016/062224
§ 371 (c)(1),
(2) Date: Oct. 5, 2017

(87) PCT Pub. No.: WO2017/002429
PCT Pub. Date: Jan. 5, 2017

(65) Prior Publication Data
US 2018/0083686 A1    Mar. 22, 2018

(30) Foreign Application Priority Data
Jun. 29, 2015   (JP) ................................. 2015-129903

(51) Int. Cl.
| | | |
|---|---|---|
| *H03K 7/04* | (2006.01) | |
| *H04B 7/06* | (2006.01) | |
| *H01Q 3/38* | (2006.01) | |
| *H04L 25/49* | (2006.01) | |

(52) U.S. Cl.
CPC ............. *H04B 7/0682* (2013.01); *H01Q 3/38* (2013.01); *H04B 7/06* (2013.01); *H04L 25/49* (2013.01)

(58) Field of Classification Search
USPC .................................. 375/239, 316, 219, 295
See application file for complete search history.

(56) References Cited

U.S. PATENT DOCUMENTS

| | | | |
|---|---|---|---|
| 2005/0094714 A1* | 5/2005 | Robinson ............. | H04B 1/0483 375/148 |
| 2011/0299456 A1* | 12/2011 | Schmidt ................. | H01Q 1/246 370/328 |

FOREIGN PATENT DOCUMENTS

| | | |
|---|---|---|
| JP | 2013-207522 A | 10/2013 |
| JP | 2014-143552 A | 8/2014 |

\* cited by examiner

*Primary Examiner* — Zewdu Kassa
(74) *Attorney, Agent, or Firm* — Drinker Biddle & Reath LLP

(57) ABSTRACT

An array antenna system 3 includes: a transmission unit 14 to which a plurality of pulse signals are given, the pulse signals being obtained by pulse-modulation of digital transmission signals, and including analog transmission signals corresponding to the digital transmission signals, the transmission unit 14 being configured to transmit, as radio signals, the plurality of analog transmission signals included in the plurality of pulse signals; and a plurality of adjustment units 15 configured to perform, for the plurality of pulse signals to be given to the transmission unit 14, an adjustment process for adjusting the relationship of relative phases of the plurality of analog transmission signals included in the plurality of pulse signals.

6 Claims, 7 Drawing Sheets

ARRAY ANTENNA SYSTEM

TECHNICAL FIELD

The present invention relates to an array antenna system.

BACKGROUND ART

A base station apparatus of a wireless communication system for mobile phones etc. sometimes adopts an array antenna capable of directivity adjustment (for example, refer to Patent Literature 1).

An array antenna includes a plurality of antenna elements, and a plurality of phase shifters provided so as to correspond to the plurality of antenna elements, respectively.

The array antenna receives a radio-frequency analog transmission signal given from the outside, distributes the transmission signal into signals corresponding to the plurality of antenna elements, respectively, and radiates the transmission signals into the space via the plurality of antenna elements. The plurality of phase shifters adjust the relationship of relative phases of the plurality of transmission signals, respectively, thereby adjusting the directivities of the transmission signals when being radiated from the plurality of antenna elements.

CITATION LIST

Patent Literature

PATENT LITERATURE 1: Japanese Laid-Open Patent Publication No. 2013-207522

SUMMARY OF INVENTION

An array antenna system according to one embodiment includes: a transmission unit to which a plurality of pulse signals are given, the pulse signals being obtained by pulse-modulation of digital transmission signals, and including analog transmission signals corresponding to the digital transmission signals, the transmission unit being configured to transmit, as radio signals, the plurality of analog transmission signals included in the plurality of pulse signals, respectively; and adjustment units configured to perform an adjustment process for adjusting relationship of relative phases of the plurality of analog transmission signals included in the plurality of pulse signals, the adjustment process being performed for at least either the plurality of pulse signals to be given to the transmission unit or the plurality of digital transmission signals corresponding to the plurality of pulse signals.

DESCRIPTION OF EMBODIMENTS

Problems to be Solved by Embodiments

Figure 1:
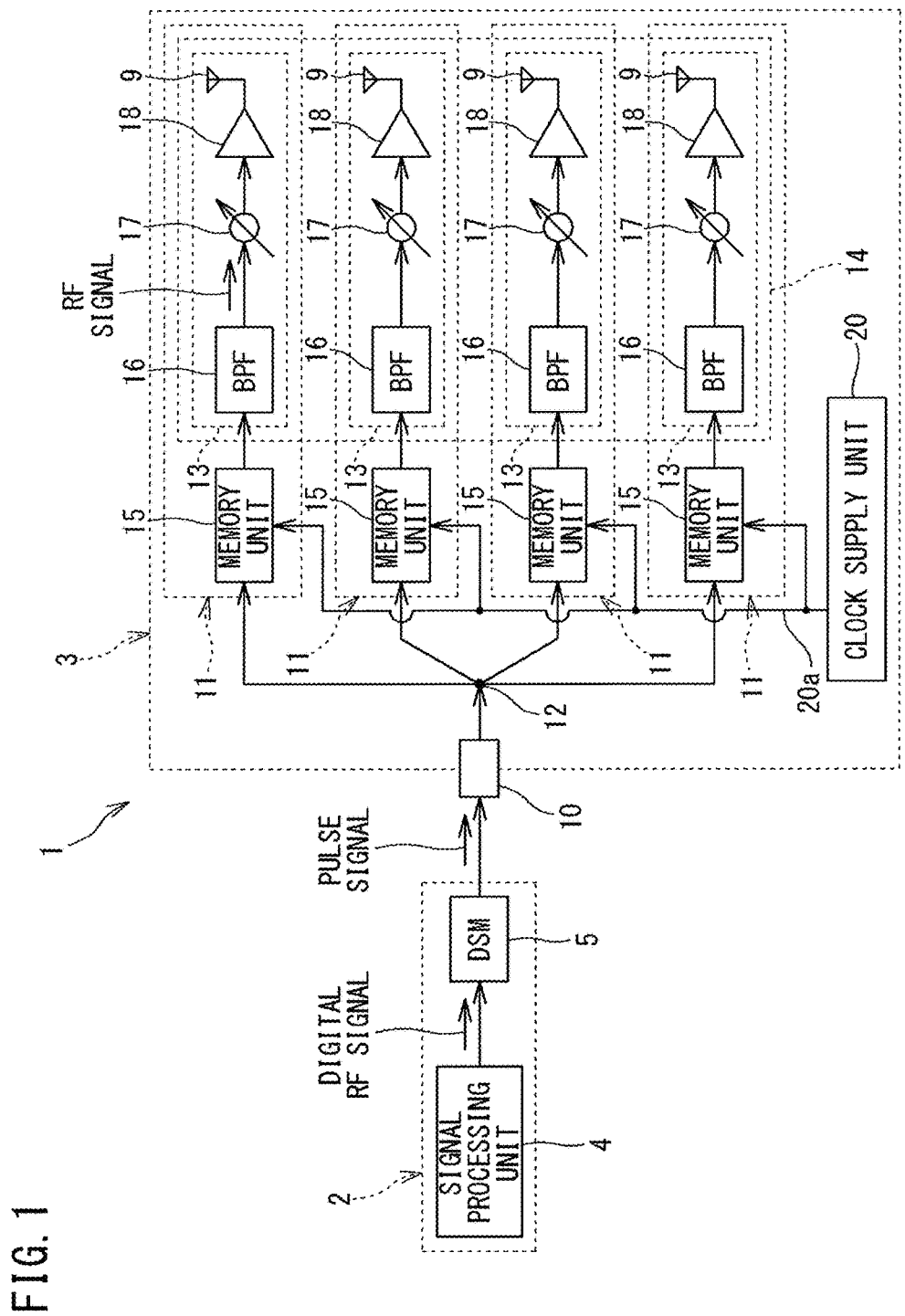
FIG. 1 is a block diagram showing a part of a communication apparatus including an array antenna system.

In the conventional array antenna described above, a signal cable is connected to each of the antenna elements, and the analog transmission signal is given to each antenna element via the signal cable.

Therefore, delay errors occur among the plurality of transmission signals due to difference in length or difference in connection manner or the like among the signal cables connected to the respective antenna elements.

Although it is conceivable to eliminate such delay errors by adjusting the phases including the delay errors by using the phase shifters, it may be difficult to perform accurate phase adjustment because the phase shifters themselves may cause delay errors.

As described above, the conventional array antenna treats the analog transmission signal, and the analog transmission signal needs to be processed continuously on a time axis. Therefore, if a delay error occurs, it is difficult to absorb the delay error, which makes it difficult to accurately adjust the relationship of the relative phases of the plurality of transmission signals.

Therefore, an object of the present invention is to provide an array antenna system capable of accurately adjusting the relationship of relative phases of transmission signals to be transmitted from the respective antennas.

Effect of Embodiment

According to the array antenna system, it is possible to accurately adjust the relationship of the relative phases of the transmission signals to be transmitted from the respective antennas.

DESCRIPTION OF EMBODIMENT

First, the contents of the embodiment of the present invention will be listed and described.

(1) An array antenna system according to one embodiment includes: a transmission unit to which a plurality of pulse signals are given, the pulse signals being obtained by pulse-modulation of digital transmission signals, and including analog transmission signals corresponding to the digital transmission signals, the transmission unit being configured to transmit, as radio signals, the plurality of analog transmission signals included in the plurality of pulse signals, respectively; and adjustment units configured to perform an adjustment process for adjusting relationship of relative phases of the plurality of analog transmission signals included in the plurality of pulse signals, the adjustment process being performed for at least either the plurality of pulse signals to be given to the transmission unit or the plurality of digital transmission signals corresponding to the plurality of pulse signals.

According to the array antenna system configured as described above, the adjustment units have, as target signals to be adjusted, the plurality of digital transmission signals or the plurality of pulse signals. Therefore, the adjustment units can accurately adjust the clock timings of the respective pulse signals or the phases of the analog transmission signals included in the respective pulse signals. As a result, the relationship of the relative phases of the plurality of analog transmission signals to be given to the transmission unit can be accurately adjusted, with the analog transmission signals being included in the plurality of pulse signals, whereby the relationship of the relative phases of the radio signals to be transmitted can be accurately adjusted.

(2) In the array antenna system described above, the adjustment units are preferably buffers which are provided so as to correspond to the plurality of pulse signals, respectively, and perform the adjustment process by temporarily storing therein the plurality of pulse signals, and adjusting clock timings of the plurality of pulse signals.

In this case, even if each of the plurality of pulse signals includes a delay error at the stage previous to the buffers, the clock timings of the plurality of pulse signals can be accurately adjusted by the buffers, whereby the phases of the analog transmission signals included in the plurality of pulse signals can be accurately adjusted. Thus, the relationship of the relative phases of the plurality of analog transmission signals can be adjusted more accurately.

(3) In the array antenna system described above, the adjustment units may be phase adjusters configured to perform the adjustment process by adjusting the phases of the plurality of digital transmission signals, respectively.

In this case, the phases of the analog transmission signals being included in the pulse signals can be adjusted by adjusting the phases of the plurality of digital transmission signals, whereby the relationship of the relative phases of the plurality of analog transmission signals included in the plurality of pulse signals, respectively, can be accurately adjusted.

(4) In the above (3), the phase adjusters preferably perform the adjustment process by adjusting the phases on the basis of a reference phase which indicates a reference of a relative phase in each of the plurality of digital transmission signals, and is obtained by calibration based on a reception intensity when the radio signals transmitted from the transmission unit are received.

In this case, even if a relative delay error occurs in each of the plurality of pulse signals, the relationship of the relative phases of the plurality of analog transmission signals can be appropriately adjusted by adjusting the phase on the basis of the reference phase.

(5) In the above (1) or (2), the array antenna system preferably includes an input unit configured to externally receive the pulse signals. In this case, the array antenna system can receive and transmit the pulse signals.

(6) In the above (1) to (4), the array antenna system may further include: an input unit configured to externally receive the digital transmission signals; and modulation units configured to pulse-modulate the received digital transmission signals, and give pulse signals obtained through the pulse modulation to the adjustment units. In this case, the array antenna system can receive the digital transmission signals.

(7) The plurality of pulse signals are preferably pulse signals obtained by subjecting the digital transmission signals to delta-sigma modulation.

Details of Embodiments

Hereinafter, preferred embodiments will be described with reference to the drawings.

At least some parts of the embodiments described below may be combined together as desired.

Communication Apparatus

FIG. 1 is a block diagram showing a part of a communication apparatus provided with an array antenna system.

This communication apparatus 1 has a function of performing wireless communication with other communication apparatuses, and includes: a signal processing device 2 configured to perform signal processing regarding a communication signal; and an array antenna system 3. FIG. 1 shows a transmission side of the communication apparatus 1.

The signal processing device 2 includes a signal processing unit 4, and a bandpass delta-sigma modulator 5.

The signal processing unit 4 performs primary modulation such as digital quadrature modulation on a digital baseband signal (e.g., IQ baseband signal) to generate a digital transmission signal (digital RF (Radio Frequency) signal). The digital RF signal has a carrier wave frequency $f_0$.

The signal processing unit 4 gives the generated digital RF signal to the delta-sigma modulator 5. The primary modulation described above is not limited to quadrature modulation, and any modulation may be performed as long as the baseband signal is modulated by a carrier wave (frequency $f_0$).

The delta-sigma modulator 5 performs delta-sigma modulation on the digital RF signal given from the signal processing unit 4 to output a pulse signal (quantized signal) which is a digital signal.

The pulse signal outputted from the signal processing device 2 includes, as a signal component, an RF signal (analog transmission signal) having a carrier wave frequency $f_0$, and represents the RF signal having the carrier wave frequency $f_0$.

Besides the RF signal, the pulse signal also includes, as signal components, signals of other frequencies, such as quantization noise caused by delta-sigma modulation. The pulse signal outputted from the signal processing device 2 is given to the array antenna system 3 (hereinafter also simply referred to as an antenna system 3).

The antenna system 3 includes a plurality of (four in the example shown in FIG. 1) antenna elements 9 each configured to transmit and receive a radio frequency signal. The antenna system 3 has a function of, when the communication apparatus 1 performs wireless communication with another communication apparatus, transmitting and receiving a radio signal regarding the wireless communication.

The antenna elements 9 are arrayed at predetermined intervals, and forms an array antenna. Therefore, the antenna system 3 has a function of forming a beam by adjusting the phase of the signal transmitted from each antenna element 9.

Array Antenna System According to First Embodiment

The antenna system 3 includes: an input unit 10 configured to receive the pulse signal given from the signal processing device 2; and a plurality of (four in the example shown in FIG. 1) transmission modules 11 provided so as to correspond to the respective antenna elements 9.

Upon receiving the pulse signal given from the signal processing device 2, the input unit 10 gives the pulse signal to a distributor 12 configured to distribute the pulse signal to the respective transmission modules 11.

The distributor 12 distributes the given pulse signal to the respective transmission modules 11. Since the pulse signals given to the respective transmission modules 11 are pulse signals into which one pulse signal is divided, the RF signals represented by the respective pulse signals are in phase with each other.

Each transmission module 11 has a function of extracting the analog RF signal from the pulse signal given from the signal processing device 2 via the input unit 10 and the distributor 12, and wirelessly transmitting the RF signal from the corresponding antenna element 9. Each transmission module 11 is housed in a housing of the antenna system 3.

Each transmission module 11 is configured to include a memory unit 15, an analog bandpass filter 16, a phase shifter 17, a power amplifier 18, and the antenna element 9. The respective transmission modules 11 have substantially the same configuration.

The memory unit 15 is connected to a stage subsequent to the distributor 12, and is given the pulse signal from the signal processing device 2. The memory unit 15 is composed of an FiFo (First-in First-out) memory, and gives the pulse signal received from the signal processing device 2 to the bandpass filter 16 in a stage subsequent thereto. In addition, the memory unit 15 temporarily stores the pulse signal therein. The memory unit 15 has a function of adjusting the clock timing of the pulse signal by adjusting the timing to output the stored pulse signal toward the bandpass filter 16.

The bandpass filter 16 is connected to a stage subsequent to the memory unit 15. A frequency range within which the bandpass filter 16 allows signals to pass is set so as to include the frequency band of the RF signal having the carrier wave frequency $f_0$.

Therefore, when the pulse signal from the memory unit 15 is given to the bandpass filter 16, the bandpass filter 16 allows the frequency component of the RF signal included in the pulse signal to pass, and inhibits passage of other frequency components such as quantization noise.

When the pulse signal passes through the bandpass filter 16, the quantization noise and the like are eliminated therefrom, resulting in an analog RF signal as a transmission signal.

That is, the bandpass filter 16 has a function as an extraction unit. The extraction unit extracts the analog RF signal from the pulse signal given from the memory unit 15, and gives the extracted RF signal to the phase shifter 17 in a stage subsequent thereto.

The phase shifter 17 is connected to a stage subsequent to the bandpass filter 16, and adjusts the phase of the RF signal given from the bandpass filter 16. That is, the phase shifter 17 is a phase shifter for an analog signal.

The phase shifter 17 gives the phase-adjusted RF signal to the power amplifier 18 in a stage subsequent thereto.

The power amplifier 18 amplifies the power of the RF signal given from the phase shifter 17. The antenna element 9 is connected to an output end of the power amplifier 18.

The power amplifier 18 gives the amplified RF signal to the antenna element 9.

The RF signal given to the antenna element 9 is radiated from the antenna element 9 into the space and is transmitted as a radio signal.

The bandpass filter 16, the phase shifter 17, the power amplifier 18, and the antenna element 9 form a transmission processing unit 13 to which the pulse signal including the RF signal is given and which transmits, as a radio signal, the RF signal included in the given pulse signal. A plurality of (four in the example shown in FIG. 1) transmission processing units 13, each performing processing regarding an analog signal, are provided so as to correspond to the antenna elements 9.

The four transmission processing units 13 form a transmission unit 14. The transmission unit 14 is given a plurality of pulse signals each including an RF signal, and transmits, as radio signals, the plurality of RF signals included in the plurality of pulse signals.

As described above, each transmission module 11 has a function of extracting the analog RF signal from the digital pulse signal having been provided from the signal processing device 2 and distributed, and transmitting the RF signal as a radio signal.

Each transmission module 11 adjusts the clock timing of the given pulse signal. Further, each transmission module 11 also has a function of adjusting the phase of the RF signal to be transmitted from the antenna element 9, by using the phase shifter 17 connected to a stage subsequent to the bandpass filter 16.

The antenna system 3 includes a clock supply unit 20 configured to supply an operation clock to the memory unit 15 of each transmission module 11.

The memory unit 15 of each transmission module 11 outputs the temporarily stored pulse signal toward the bandpass filter 16 in accordance with the timing of an operation clock given from the clock supply unit 20.

A path 20a connects the clock supply unit 20 to the respective memory units 15. The line length of the path 20a is adjusted such that, when the operation clock outputted from the clock supply unit 20 reaches the respective memory units 15, the operation timings of the memory units 15 are synchronized with each other.

Therefore, the timings at which the respective memory units 15 output the pulse signals toward the bandpass filters 16 are synchronized with each other.

Thus, the respective memory units 15 synchronize the clock timings of the pulse signals.

The pulse signals outputted from the respective memory units 15 are given to the bandpass filters 16, with the clock timings thereof being synchronized with each other.

Therefore, even when relative delays have occurred in the pulse signals to be given to the respective memory units 15 in the paths from the distributor 12 to the memory units 15, the memory units 15 synchronize the clock timings of the pulse signals. Thus, in the stage subsequent to the memory units 15, delay errors having occurred in the pulse signals can be suppressed.

When the pulse signals, the clock timings of which have been adjusted to be synchronized with each other by the corresponding memory units 15, pass through the bandpass filters 16, quantization noise and the like are eliminated therefrom, resulting in RF signals.

The RF signals extracted from the respective pulse signals are substantially in phase with each other.

That is, since the RF signals represented by the respective pulse signals are in phase with each other as described above, if the pulse signals are given to the bandpass filters 16 with the delay errors remaining in the pulse signals, the extracted RF signals are delayed from each other, resulting in phase differences.

On the other hand, according to the present embodiment, since the respective pulse signals are given to the bandpass filters 16 with the clock timings thereof being synchronized with each other, the obtained RF signals are substantially in phase with each other.

Thereafter, each RF signal is phase-adjusted by the phase shifter 17 in a stage subsequent to the bandpass filter 16 so that a beam is formed in a predetermined direction with respect to the antenna system 3.

At this time, since the RF signals that are substantially in phase with each other are stably given to the respective phase shifters 17, the phase shifters 17 can accurately perform phase adjustment while maintaining relationship of the relative phases of the RF signals.

As described above, the plurality of memory units 15 according to the present embodiment are provided so as to correspond to the plurality of pulse signals, respectively, and have functions as buffers for performing an adjustment process for temporarily storing therein the plurality of pulse signals, and adjusting the clock timings of the plurality of pulse signals so that the phases of the RF signals represented by the respective pulse signals are synchronized with each other.

That is, the plurality of memory units 15 are configured to perform, for the plurality of pulse signals, the adjustment process for adjusting the relationship of the relative phases of the RF signals represented by the respective pulse signals.

Effects

The antenna system 3 according to the present embodiment includes: the transmission unit 14 which is given a plurality of pulse signals that are obtained by delta-sigma modulation (pulse modulation) of digital RF signals (digital transmission signals) and that include RF signals (analog transmission signals) corresponding to the digital RF signals, and which transmits, as radio signals, the plurality of RF signals included in the plurality of pulse signals; and the plurality of memory units 15 serving as adjustment units to perform, on the plurality of pulse signals to be given to the transmission unit 14, the adjustment process for adjusting the relationship of the relative phases of the plurality of RF signals included in the respective pulse signals.

According to the antenna system 3 having the aforementioned configuration, each memory unit 15 has, as a target signal to be adjusted, the pulse signal which is a digital signal. Since a digital signal can be easily controlled with higher accuracy as compared with an analog signal, each memory unit 15 can easily adjust the clock timing of the pulse signal. As a result, the relationship of the relative phases of the plurality of RF signals to be given to the transmission unit 14 can be accurately adjusted, with the RF signals being included in the plurality of pulse signals, whereby the relationship of the relative phases of the radio signals to be transmitted from the respective antenna elements 9 can be accurately adjusted.

In the present embodiment, the plurality of memory units 15 form a buffer. The buffer temporarily stores therein the plurality of pulse signals, and adjusts the clock timings of the plurality of pulse signals, thereby performing the adjustment process for adjusting the plurality of pulse signals such that the phases of the RF signals represented by the respective pulse signals are synchronized with each other.

Therefore, in the stage previous to the plurality of memory units 15, even when the plurality of pulse signals respectively include delay errors caused by difference in line length, difference in line condition, or the like, the clock timings of the respective pulse signals can be accurately adjusted to be synchronized with each other by the plurality of memory units 15, whereby the phases of the RF signals included in the respective pulse signals can be accurately adjusted. Thus, the relationship of the relative phases of the plurality of RF signals can be accurately adjusted.

Since the antenna system 3 according to the present embodiment is provided with the input unit 10 configured to receive the digital pulse signal from the external signal processing device 2, the antenna system 3 can receive and transmit the pulse signal.

Beam Formation

In the present embodiment, the case where a pulse signal obtained by performing delta-sigma modulation on a digital RF signal is given to the antenna system 3 has been described. A simulation and a confirmation test were performed to judge whether or not beam formation was possible when signal transmission was performed using such a pulse signal.

In the confirmation test, a communication apparatus provided with two transmission modules 11 was used, and a signal intensity around the communication apparatus was obtained when a digital RF signal having a carrier wave frequency $f_0$ of 2.14 GHz was given to the communication apparatus to cause the communication apparatus to transmit the signal.

Figure 2:
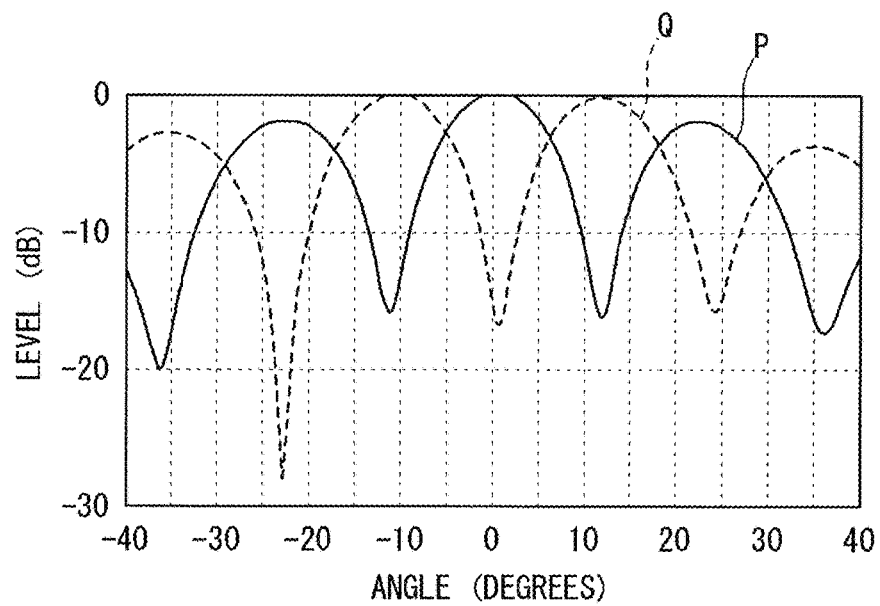
FIG. 2 is a graph showing the signal intensity around the communication apparatus when a digital RF signal is given to the communication apparatus to cause the communication apparatus to transmit the signal.

FIG. 2 is a graph showing the signal intensity around the communication apparatus when the digital RF signal is given to the communication apparatus to cause the communication apparatus to transmit the signal. In FIG. 2, the vertical axis indicates the signal intensity of the RF signal which is transmitted from the communication apparatus on the basis of the given digital RF signal. The horizontal axis indicates the angle of the periphery of the communication apparatus. The angle of 0 degrees indicates the front surface of two antenna elements 9 included in the communication apparatus, and the horizontal axis indicates the angle of the periphery of the communication apparatus with the front surface being a reference.

In FIG. 2, a solid line P indicates a result when RF signals of the same phase are transmitted from the two antenna elements 9, respectively. The solid line P has local maximum values observed at 0 degrees and ±22.5 degrees, and local minimum values observed at ±11 degrees and ±36 degrees.

A broken line Q indicates a result when RF signals of opposite phases are transmitted from the two antenna elements 9, respectively. The broken line Q has local maximum values observed at ±11 degrees and ±36 degrees, and local minimum values observed at 0 degrees and ±22.5 degrees.

That is, FIG. 2 reveals that a beam is formed when the digital RF signal is given to the communication apparatus to cause the communication apparatus to transmit the signal, and that the direction of the formed beam can be adjusted by adjusting the phase of the RF signal transmitted from each antenna element 9.

Second Embodiment

Figure 3:
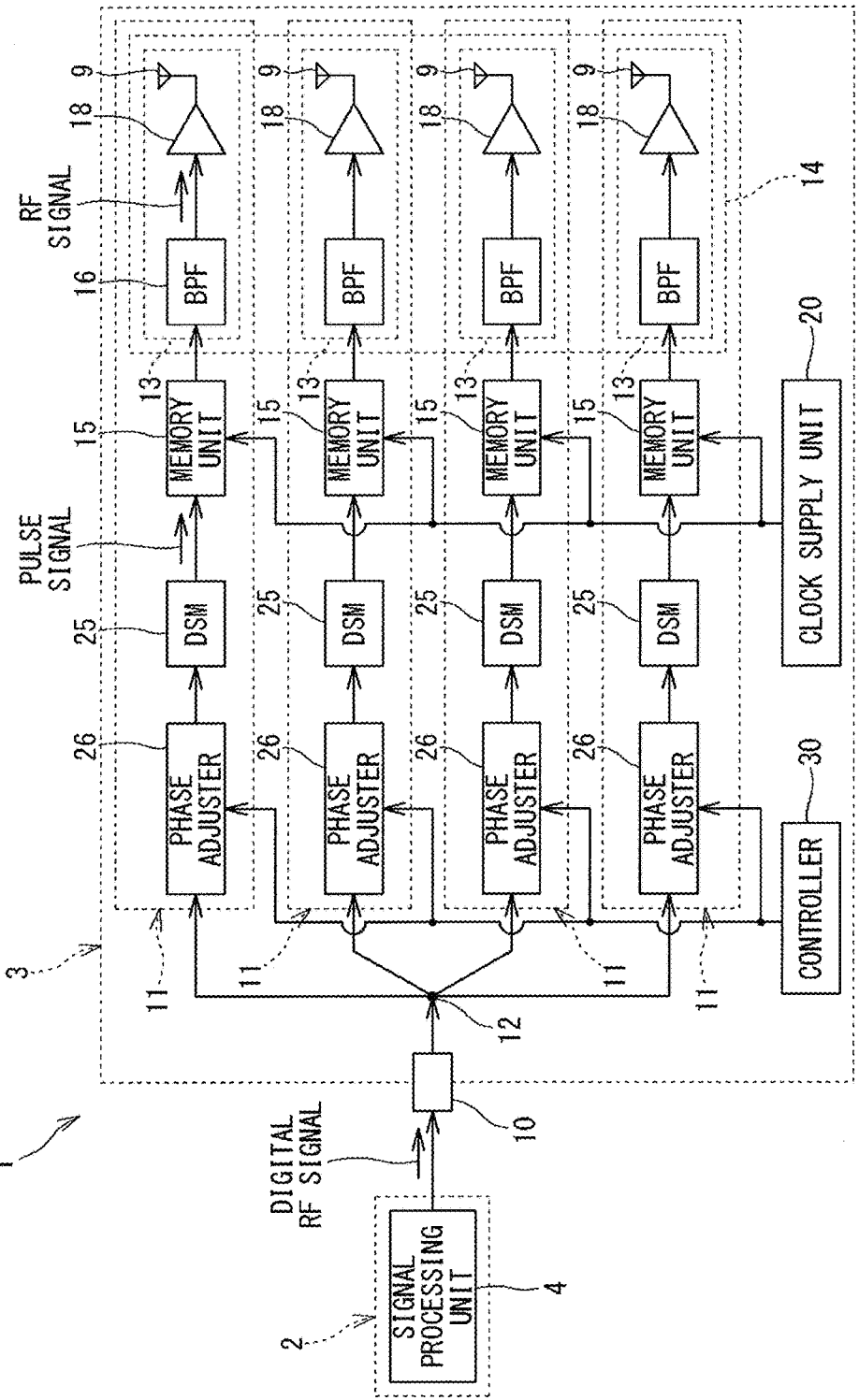
FIG. 3 is a block diagram showing a part of a communication apparatus including an antenna system according to a second embodiment.

FIG. 3 is a block diagram showing a part of a communication apparatus provided with an antenna system 3 according to a second embodiment.

The antenna system 3 according to the present embodiment is different from the first embodiment in that each transmission module 11 includes a delta-sigma modulator 25, and that a phase adjuster 26 configured to adjust the phase of a digital RF signal is provided instead of the analog phase shifter 17.

The signal processing device 2 to which the antenna system 3 according to the present embodiment is connected is provided with the signal processing unit 4. The signal processing unit 4 generates a digital RF signal as in the first embodiment.

The signal processing unit 4 gives the generated digital RF signal to the input unit 10 of the antenna system 3.

Therefore, the input unit 10 of the antenna system 3 according to the present embodiment receives the digital RF signal given from the signal processing device 2.

Upon receiving the digital RF signal given from the signal processing device 2, the input unit 10 gives this digital RF signal to the distributor 12, and the distributor 12 distributes the digital RF signal to the respective transmission modules 11. The digital RF signals distributed to the respective transmission modules 11 are in phase with each other.

Each transmission module 11 performs delta-sigma modulation on the digital RF signal given from the signal processing device 2 via the input unit 10 and the distributor 12, to generate a pulse signal. Each transmission module 11 has a function of extracting an analog RF signal from the generated pulse signal, and wirelessly transmitting the analog RF signal from the corresponding antenna element 9.

The transmission module 11 according to the present embodiment includes the phase adjuster 26 and the delta-sigma modulator 25 as described above.

The phase adjuster 26 is connected to a stage subsequent to the distributor 12, and the digital RF signal from the signal processing device 2 is given to the phase adjuster 26. The phase adjuster 26 has a function of adjusting the phase of the given digital RF signal.

The phase adjuster 26 gives the phase-adjusted digital RF signal to the delta-sigma modulator 25 in a stage subsequent thereto. That is, the phase adjuster 26 performs an adjustment process by adjusting the phase of the digital RF signal before being subjected to delta-sigma modulation.

The delta-sigma modulator 25 is connected to a stage subsequent to the phase adjuster 26. The delta-sigma modulator 25 has the same configuration as the delta-sigma modulator 5 included in the signal processing device 2 according to the first embodiment. The delta-sigma modulator 25 performs delta-sigma modulation on the phase-adjusted digital RF signal given from the phase adjuster 26, and outputs a pulse signal representing the RF signal.

The pulse signal outputted from delta-sigma modulator 25 is given to the memory unit 15 in a stage subsequent to the delta-sigma modulator 25.

The memory unit 15, the bandpass filter 16, and the power amplifier 18 have the same configurations as those of the first embodiment.

Therefore, the memory unit 15 temporarily stores therein the pulse signal given from the delta-sigma modulator 25, and outputs the stored pulse signal toward the bandpass filter 16 in synchronization with other memory units 15, thereby synchronizing the clock timings of the respective pulse signals with each other.

The pulse signal given to the bandpass filter 16 is converted to an RF signal by passing through the bandpass filter 16. The RF signal extracted from the pulse signal is transmitted through the power amplifier 18 and the antenna element 9.

That is, the bandpass filter 16, the power amplifier 18, and the antenna element 9 form the transmission processing unit 13. Four transmission processing units 13 are provided so as to correspond to the antenna elements 9, and the four transmission processing units 13 form a transmission unit 14.

The antenna system 3 according to the present embodiment is provided with a controller 30 configured to control phase adjustment that is performed on the digital RF signal by the phase adjuster 26 of each transmission module 11.

The controller 30 controls the phase amount of each phase adjuster 26 to control the direction of a beam formed by the RF signal transmitted from the antenna element 9.

Each phase adjuster 26 performs phase adjustment on the digital RF signal in accordance with an instruction of the controller 30. The phase adjustment performed by each phase adjuster 26 is phase-shifting of the RF signal with respect to the clock timing of the digital RF signal.

The digital RF signal phase-shifted by each phase adjuster 26 is given to the corresponding delta-sigma modulator 25. Each delta-sigma modulator 25 generates a pulse signal representing the RF signal in the phase-shifted state.

When the clock timings of the pulse signals outputted from the respective delta-sigma modulators 25 are synchronized with each other, the RF signals represented by the respective pulse signals are in a state of maintaining the relationship of the phases thereof that are set by the controller 30 and the respective phase adjusters 26.

Therefore, the RF signals, which are extracted from the pulse signals passing through the bandpass filters 16 in the above state, respectively, are extracted as the RF signals that maintain the relationship of the phases set by the controller 30 and the phase adjuster 26.

As described above, each digital RF signal before being delta-sigma-modulated is subjected to phase adjustment and then is converted into a pulse signal, and thereafter, the clock timings of the respective pulse signals are synchronized with each other. Therefore, even when a delay occurs until reaching the stage subsequent to the memory unit 15, this delay is suppressed, whereby accuracy of the phase adjustment by each phase adjuster 26 is inhibited from being reduced.

Thereafter, each RF signal is amplified by the power amplifier 18 in a stage subsequent to the bandpass filter 16, and is transmitted from the corresponding antenna element 9.

As described above, the phase adjuster 26 according to the present embodiment adjusts the phase of the digital RF signal before being delta-sigma-modulated, whereby the phases of the RF signals represented by the plurality of pulse signals can be adjusted. That is, the phases of the RF signals can be adjusted while the RF signals are included in the pulse signals, whereby the relationship of the relative phases of the plurality of RF signals included in the plurality of pulse signals can be accurately adjusted. As a result, it is possible to more accurately adjust the relationship of the relative phases of the plurality of radio signals to be transmitted from the transmission unit 14 via the plurality of antenna elements 9.

Further, in the present embodiment, each phase adjuster 26 is configured to adjust the phase of the digital RF signal before being delta-sigma-modulated, and the plurality of memory units 15 are configured to adjust the clock timings of the plurality of pulse signals.

That is, in the present embodiment, the phase adjusters 26 and the memory units 15, which serve as adjustment units, are configured to perform, on both the digital RF signals before being delta-sigma-modulated and the plurality of pulse signals to be given to the plurality of bandpass filters 16, an adjustment process for adjusting the relationship of the relative phases of the RF signals represented by the plurality of pulse signals.

Therefore, according to the present embodiment, the clock timings of the pulse signals can be synchronized with each other after the digital RF signals are phase-adjusted, whereby the relationship of the relative phases of the RF signals can be adjusted more accurately.

Since each input unit 10 of the antenna system 3 according to the present embodiment is configured to receive a digital RF signal from the signal processing device 2, the antenna system 3 can receive and transmit the digital RF signal.

Third Embodiment

Figure 4:
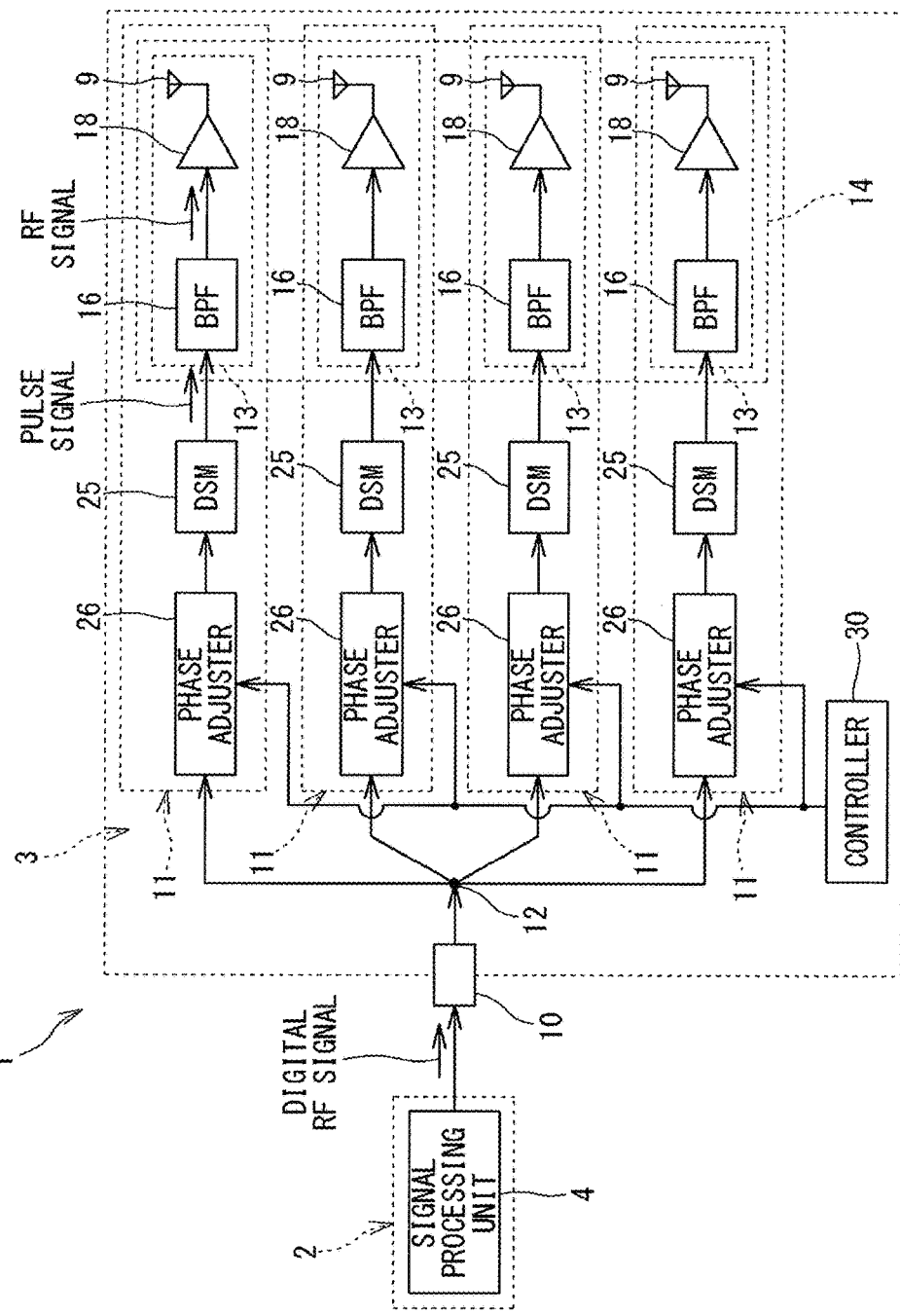
FIG. 4 is a block diagram showing a part of a communication apparatus including an antenna system according to a third embodiment.

FIG. 4 is a block diagram showing a part of a communication apparatus provided with an antenna system 3 according to a third embodiment.

The antenna system 3 according to the present embodiment is different from the second embodiment in that the antenna system 3 has no memory units 15. Other components are the same as those in the second embodiment.

In the present embodiment, since the antenna system 3 does not have the memory units 15 which are provided in the second embodiment, the clock timings of the pulse signals generated by the plurality of delta-sigma modulators 25 cannot be synchronized with each other.

Therefore, it is not possible to determine the relationship of the relative phases of the RF signals to be outputted from the respective transmission modules 11.

Therefore, the antenna system 3 according to the present embodiment performs a calibration process for acquiring in advance the relationship of the relative phases of the RF signals to be outputted from the respective transmission modules 11. The antenna system 3 performs phase adjustment on the basis of the relationship of the relative phases of the RF signals to be outputted from the respective transmission modules 11, which relationship is obtained in the calibration process.

In the calibration process, an RF signal outputted from each transmission module 11 and transmitted from the antenna element 9 is actually received, and a reference phase to be a reference of the phase in each transmission module 11 is obtained on the basis of the reception intensity at that time.

Figure 5:
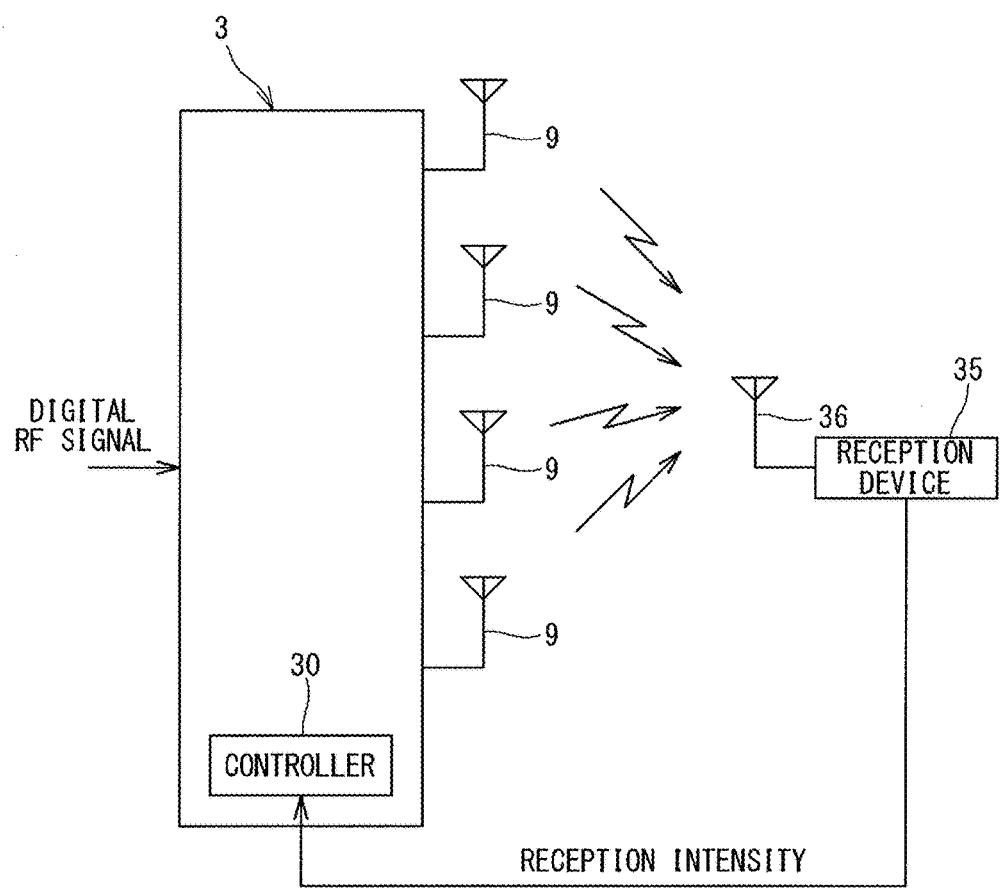
FIG. 5 is a diagram showing an example of a calibration process.

FIG. 5 is a diagram showing an example of the calibration process.

As shown in FIG. 5, in order to perform the calibration process, first, a reception device 35 configured to receive the RF signals transmitted from the antenna system 3 is placed in front of and at a predetermined distance from the antenna system 3 according to the present embodiment.

The reception device 35 has a function of receiving, by an antenna 36, the RF signals transmitted from the respective antenna elements 9 of the antenna system 3.

After the reception device 35 is placed in front of the antenna system 3, the antenna system 3 is caused to transmit the RF signals.

At this time, the reception device 35 sequentially measures the reception intensities of the RF signals (radio signals) transmitted from the antenna system 3, and sequentially gives information indicating the measured reception intensities to the controller 30 of the antenna system 3.

The antenna system 3 transmits the RF signals with the transmission power being kept constant, while controlling the phase adjusters 26, of the transmission modules 11, corresponding to the respective antenna elements 9.

At this time, the controller 30 of the antenna system 3 controls the respective phase adjusters 26 so that the reception intensity in the reception device 35 becomes maximum.

It can be said that, when the reception intensity in the reception device 35 becomes maximum, the RF signal transmitted from each antenna element 9 forms a beam in the front direction of the antenna system 3.

Therefore, the controller 30 stores therein, as a reference phase, a setting regarding the phase of each phase adjuster 26 when the reception intensity in the reception device 35 becomes maximum.

Thus, the controller 30 can perform phase adjustment to form a beam in the front direction of the antenna system 3 by setting each phase adjuster 26 to the reference phase.

As described above, when each phase adjuster 26 is set to the reference phase, the RF signals outputted from the respective transmission modules 11 are accurately phase-adjusted so as to suppress delays therebetween, in forming the beam in the front direction of the antenna system 3.

When the controller 30 performs phase adjustment while controlling each phase adjuster 26 on the basis of the reference phase, beam formation can be achieved not only in the front direction of the antenna system 3 but also in other directions.

As described above, the controller 30 can obtain the reference phase of each phase adjuster 26 by performing the calibration process.

In the present embodiment, each phase adjuster 26 performs the adjustment process by adjusting the phase on the basis of the reference phase which indicates the reference of the relative phase in each of the digital RF signals before being subjected to pulse modulation and which is obtained through the calibration process based on the reception intensity when the RF signals (radio signal) transmitted from the transmission unit 14 via the plurality of antenna elements 9 are received. Therefore, even in a case where a relative delay error occurs in each of the plurality of pulse signals, if phase adjustment is performed on the basis of the reference phase, phase setting based on the RF signal actually transmitted in the calibration process can be achieved, whereby the relationship of the relative phases of the RF signals can be appropriately adjusted.

While in the above embodiment, the controller 30 stores therein the reference phase of each phase adjuster 26, the controller 30 may give the obtained reference phase to each phase adjuster 26 to cause the phase adjuster 26 to store the reference phase. In this case, each phase adjuster 26 performs phase adjustment on the basis of its own reference phase stored therein.

Figure 6:
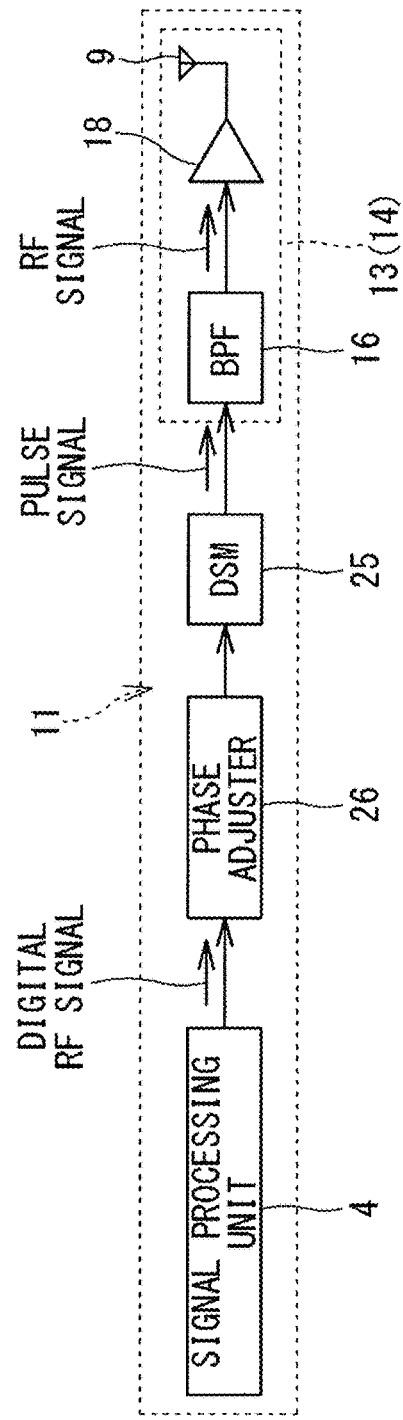
FIG. 6 is a block diagram showing a transmission module that is a component of an antenna system according to a modification of the third embodiment.

FIG. 6 is a block diagram showing a transmission module 11 as a component of an antenna system 3 according to a modification of the third embodiment.

In FIG. 6, the antenna system 3 according to the modification includes a signal processing unit 4 in addition to the phase adjuster 26, the delta-sigma modulator 25, the bandpass filter 16, and the power amplifier 18.

That is, a plurality of transmission modules 11 as components of the antenna system 3 according to the present embodiment are installed independently from each other. The antenna elements 9 in the respective transmission modules 11 form an array antenna. The antenna system 3 can transmit signals by using the antenna elements 9, of the transmission modules 11, forming the array antenna.

The transmission processing units 13 in the respective transmission modules 11 form the transmission unit 14 independently from each other.

An RF signal to be transmitted from the antenna system 3 is stored in the signal processing units 4 of the respective transmission modules 11 in advance, and the transmission modules 11 are configured to transmit the RF signals containing the same information, in synchronization with each other.

Figure 7:
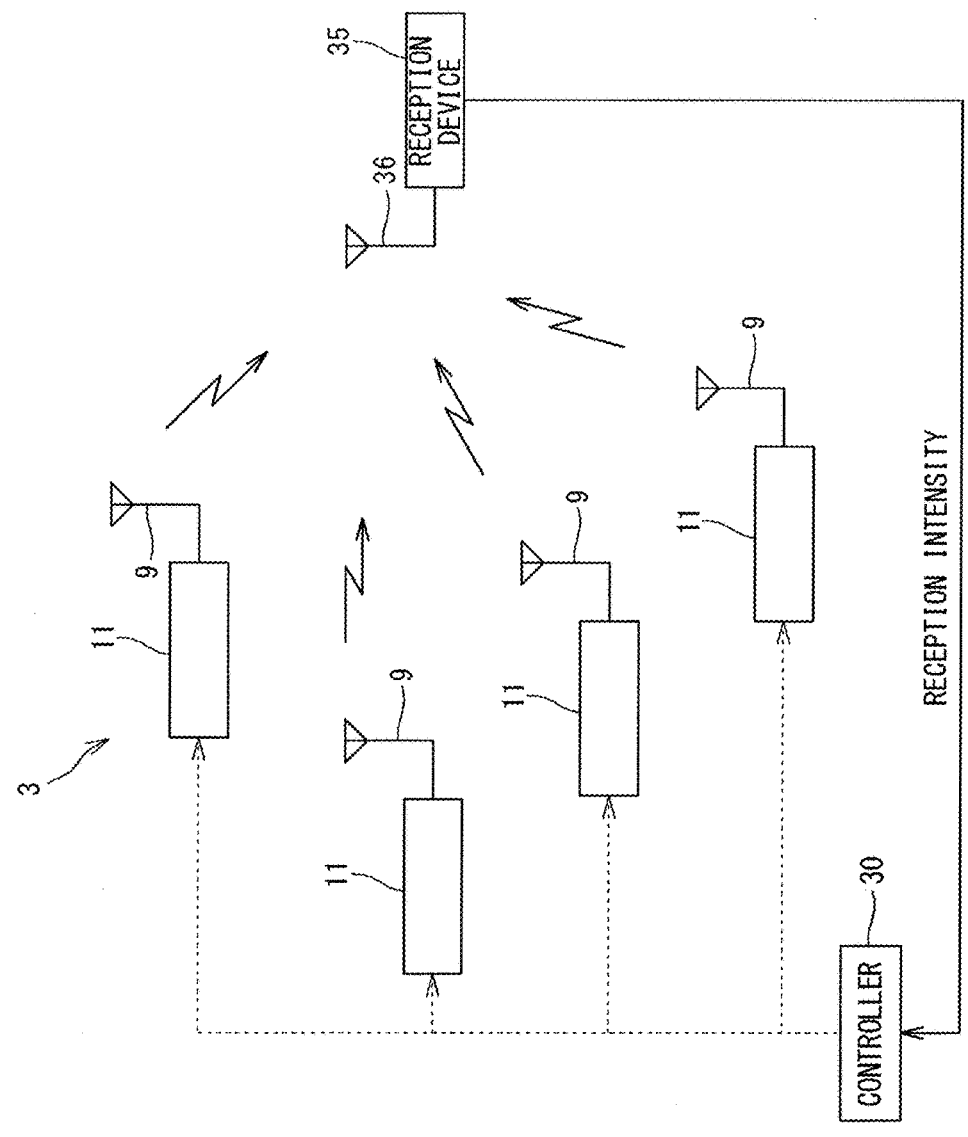
FIG. 7 is a diagram showing an example of a calibration process of the antenna system according to the modification.

FIG. 7 is a diagram showing an example of a calibration process of the antenna system 3 according to the modification. As shown in FIG. 7, in this modification, the respective transmission modules 11 are not housed in a single housing but are located at positions moderately separated from each other.

When the calibration process is performed, the controller 30 needs to be connected to each transmission module 11 in order to obtain a reference phase by controlling the phase adjuster 26 included in the transmission module 11. Once the reference phase is obtained and stored in the phase adjuster 26 or the like of the transmission module 11, the respective transmission modules 11 can be operated independently from each other.

In the modification described above, since the respective transmission modules 11 can be located at positions separated from each other, the degree of freedom in installing the antenna system 3 can be increased.

Others

In the first and second embodiments, the plurality of memory units 15 synchronize and adjust the clock timings of the respective pulse signals. However, in a configuration in which an operation clock to be given to each memory unit 15 can be set independently for each memory unit 15, it is possible not only to synchronize the clock timings of the respective pulse signals but also to independently adjust the clock timings of the respective pulse signals to adjust the relationship of the relative phases of the RF signals represented by the respective pulse signals.

In the aforementioned embodiments, the bandpass filters are used for extracting the RF signals from the pulse signals modulated by delta-sigma modulation. However, low-pass filters or other filters may be used instead of the bandpass filters so long as signals in a target frequency band can be extracted by the filters, or a device having a function of extracting signals in a target frequency band may be used.

CONCLUSION

The embodiments disclosed herein is to be considered in all respects as illustrative and not restrictive. The scope of the present invention is indicated by the appended claims rather than by the foregoing meaning, and all changes that come within the meaning and range of equivalency of the claims are therefore intended to be embraced therein.

REFERENCE SIGNS LIST 1 communication apparatus
2 signal processing device
3 array antenna system
4 signal processing unit
5 modulator
9 antenna element
10 input unit
11 transmission module
12 distributor
13 transmission processing unit
14 transmission unit
15 memory unit
16 bandpass filter
17 phase shifter
18 power amplifier
20 clock supply unit
20a path
25 delta-sigma modulator
26 phase adjuster
30 controller
35 reception device
36 antenna

The invention claimed is:

1. An array antenna system comprising:
a transmitter to which a plurality of pulse signals are given, the pulse signals being obtained by pulse-modulation of digital transmission signals, and including analog transmission signals corresponding to the digital transmission signals, the transmitter being configured to transmit, as radio signals, the plurality of analog transmission signals included in the plurality of pulse signals, respectively; and
adjusters configured to perform an adjustment process for adjusting relationship of relative phases of the plurality of analog transmission signals included in the plurality of pulse signals, the adjustment process being performed for at least either the plurality of pulse signals to be given to the transmitter or the plurality of digital transmission signals corresponding to the plurality of pulse signals, wherein
the adjusters are buffers which are provided so as to correspond to the plurality of pulse signals, respectively, and perform the adjustment process by temporarily storing therein the plurality of pulse signals, and adjusting clock timings of the plurality of pulse signals.

2. The array antenna system according to claim 1, wherein the adjusters include phase adjusters configured to perform the adjustment process by adjusting the phases of the plurality of digital transmission signals, respectively.

3. The array antenna system according to claim 2, wherein the phase adjusters perform the adjustment process by adjusting the phases on the basis of a reference phase, the reference phase indicating a reference of a relative phase in each of the plurality of digital transmission signals, and being obtained by calibration based on a reception intensity when the radio signals transmitted from the transmitter are received.

4. The array antenna system according to claim 1 further including an input unit configured to externally receive the pulse signals.

5. The array antenna system according to claim 1 further including:
an input unit configured to externally receive the digital transmission signals; and
modulators configured to pulse-modulate the received digital transmission signals, and give the pulse signals obtained through the pulse modulation to the adjusters.

6. The array antenna system according to claim 1, wherein the plurality of pulse signals are pulse signals obtained by subjecting the digital transmission signals to delta-sigma modulation.

* * * * *